United States Patent
Bhattacharyya et al.

(10) Patent No.: US 11,361,219 B1
(45) Date of Patent: Jun. 14, 2022

(54) FEATURE SELECTION OF NEURAL ACTIVITY USING HIERARCHICAL CLUSTERING WITH STOCHASTIC SEARCH

(71) Applicant: HRL Laboratories, LLC, Malibu, CA (US)

(72) Inventors: Rajan Bhattacharyya, Sherman Oaks, CA (US); Brian L. Burns, West Hollywood, CA (US); Kang-Yu Ni, Calabasas, CA (US); James Benvenuto, Beverly Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1342 days.

(21) Appl. No.: 15/335,341

(22) Filed: Oct. 26, 2016

Related U.S. Application Data (60) Provisional application No. 62/246,494, filed on Oct. 26, 2015.

(51) Int. Cl.
   *G06N 3/08* (2006.01)
   *G06F 16/28* (2019.01)

(52) U.S. Cl.
   CPC .............. *G06N 3/08* (2013.01); *G06F 16/285* (2019.01)

(58) Field of Classification Search
   CPC .................................. G06N 3/08; G06F 16/285
   See application file for complete search history.

(56) References Cited

U.S. PATENT DOCUMENTS

| | | | |
|---|---|---|---|
| 2004/0138579 A1* | 7/2004 | Deadwyler | A61B 5/04001 600/544 |
| 2013/0073490 A1* | 3/2013 | Baughman | G06N 3/126 706/13 |
| 2017/0216595 A1* | 8/2017 | Geva | A61N 5/0622 |

OTHER PUBLICATIONS

Jenatton, Multi-scale Mining of fMRI Data with Hierarchical Structured Sparsity (Year: 2011).*
Chou, Voxel Selection Framework in Multi-Voxel Pattern Analysis of fMRI Data for Prediction of Neural Response to Visual Stimuli (Year: 2014).*
Jennton, Multiscale Mining of fMRI Data with Hierarchical Structured Sparsity (Year: 2012).*
Gramfort, Multiscale Mining of fMRI Data with Hierarchical Structured Sparsity (Year: 2011).*

(Continued)

*Primary Examiner* — Abdullah Al Kawsar
*Assistant Examiner* — Tewodros E Mengistu
(74) *Attorney, Agent, or Firm* — Tope-McKay & Associates (57) ABSTRACT

Described is a system for feature selection that extends supervised hierarchical clustering to neural activity signals. The system generates, using a hierarchical clustering process, a hierarchical dendrogram representing a set of neural activity data comprising individual neural data elements having neural activity patterns. The hierarchical dendrogram is searched for an optimal cluster parcellation using a stochastic supervised search process. An optimal cluster parcellation of the hierarchical dendrogram is determined that provides a classification of the set of neural activity data with respect to a supervised classifier, resulting in a reduced neural activity feature set. The set of neural activity data is classified using the reduced neural activity feature set, and the classified set of neural activity data is decoded.

14 Claims, 9 Drawing Sheets
(1 of 9 Drawing Sheet(s) Filed in Color)

(56) References Cited

OTHER PUBLICATIONS

Michel, A supervised clustering approach for extracting predictive information from brain activation images (Year: 2010).*
Michel, A supervised clustering approach for fMRI-based inference of brain states (Year: 2011).*
Mota, Randomized parcellation based inference (Year: 2013).*
Aksan, An fMRI Segmentation Method Under Markov Random Fields for Brian decoding, Sep. 2015 (Year: 2015).*
Cortes, C. & Vapnik, V. (1995). Support-vector networks. Machine learning, 20(3), pp. 273-297.
Fan, R. E., Chang, K. W., Hsieh, C. J., Wang, X. R., & Lin, C. J. (2008). Liblinear: A library for large linear classification. The Journal of Machine Learning Research, 9, pp. 1871-1874.
Kay, K. N., Rokem, A., Winawer, J., Dougherty, R. F., & Wandell, B. A. (2013). GLMdenoise: a fast, automated technique for denoising task-based fMRI data Frontiers in Neuroscience, 7, pp. 1-15.
Michel, V., Gramfort, A., Varoquaux. G., Eger, E., Keribin, C., & Thirion, B. (2012). A supervised clustering approach tor fMRI-based inference of brain states Pattern Recognition, 45(6), pp. 2041-2049.
Mitchell, T.M., Shinkareva, S. V., Carlson, A., Chang, K.-M., Malave, V. L., Mason, R. A., & Just, M. A. (2008). Predicting human brain activity associated with the meanings of nouns Science, 320(5880), pp. 1191-1195.
Ward, J. H. (1963). Hierarchical grouping to optimize an objective function. Journal of the American Statistical Association, 58(301), pp. 236-244.

* cited by examiner

| | Number of Clusters | SVM Precision Score |
|---|---|---|
| SHC | 709 | 57.14% |
| SHC w/ SVM pruning | 391 | 59.14% |

FEATURE SELECTION OF NEURAL ACTIVITY USING HIERARCHICAL CLUSTERING WITH STOCHASTIC SEARCH

GOVERNMENT LICENSE RIGHTS

This invention was made with government support under U.S. Government Contract Number FA8650-13-C-7356. The government has certain rights in the invention.

CROSS-REFERENCE TO RELATED APPLICATIONS

This is a Non-Provisional application of U.S. Provisional Application No. 62/246,494, filed in the United States on Oct. 26, 2015, entitled, "Feature Selection of Neural Activity Using Hierarchical Activity with Stochastic Search," which is incorporated herein by reference in its entirety.

BACKGROUND OF INVENTION

(1) Field of Invention

The present invention relates to a system for feature selection and, more particularly, to a system for feature selection that extends supervised hierarchical clustering to neural activity signals.

(2) Description of Related Art

Feature selection is a very important component in any neural activity classification pipeline. Generally, neural activity data has very high dimensionality, which results in classifier overtraining and makes classification of brain states via these signals difficult and error prone. Numerous methods have been developed to deal with this difficultly.

For instance, Literature Reference No. 5 of the List of Incorporated Literature References discloses a method to determine which voxels are more informative by selecting the "stable" voxels that are highly correlated across repeated instances of the same stimuli and throwing the others out. This method, thereby, reduces the spatial dimensionality of the problem. However, voxels that are "stable" with respect to repeated stimuli responses are not necessarily discriminative and may not provide optimal classifier performance.

Furthermore, in Literature Reference No. 4, a method using supervised agglomerative hierarchical clustering to reduce the feature dimensionality within the spatial domain similar was described. However, the search for an optimal voxel parcellation used a deterministic method over a predefined set of parcellations in order to reduce the computational complexity. Therefore, the resulting parcellation is highly dependent on the subset of predefined parcellations, which may not contain the globally optimum parcellation from the dendrogram solution space.

Supervised hierarchical clustering of neural activity patterns is a nondeterministic polynomial-time hard (NP-hard) problem and, to knowledge, a stochastic method to search the solution space of the dendrogram has not yet been designed. Only deterministic methods have been developed that search a subset of the solution space.

Additionally, an exhaustive top-down search over the entire dendrogram is not computationally feasible, and a classifier gradient that can be minimized is not readily available. Previous work has used deterministic methods to search the dendrogram, but only over a reduced set of parcellations in order to reduce computational complexity.

Thus, a continuing need exists for a stochastic search technique that randomly permutes a population of trial parcellations and adaptively searches for the one with the highest classification score.

SUMMARY OF INVENTION

The present invention relates to a system for feature selection and, more particularly, to a system for feature selection that extends supervised hierarchical clustering to neural activity signals. The system comprises one or more processors and a non-transitory computer-readable medium having executable instructions encoded thereon such that when executed, the one or more processors perform multiple operations. Using a hierarchical clustering process, a hierarchical dendrogram is generated representing a set of neural activity data comprising individual neural data elements having neural activity patterns. The hierarchical dendrogram is searched for an optimal cluster parcellation using a stochastic supervised search process. An optimal cluster parcellation of the hierarchical dendrogram is determined that provides a classification of the set of neural activity data with respect to a supervised classifier, resulting in a reduced neural activity feature set. The set of neural activity data is classified using the reduced neural activity feature set, and the classified set of neural activity data is decoded.

In another aspect, the stochastic supervised search process is used to search a solution space of the supervised classifier constrained by the hierarchical dendrogram in order to reduce computational complexity.

In another aspect, support vector machine (SVM) weight pruning of the hierarchical dendrogram is performed during searching of the hierarchical dendrogram.

In another aspect, discriminability of clusters generated by the stochastic supervised search process is determined.

In another aspect, clusters are removed from consideration for optimal cluster parcellation if they do not contain information relevant to the supervised classifier for determining discriminability of clusters.

In another aspect, a direct mapping between the reduced neural activity feature set and neural activity patterns in individual neural data elements is generated based on the optimal cluster parcellation.

In another aspect, neural activity data is from a functional magnetic resonance imaging (fMRI), fMRI BOLD, electroencephalogram (EEG), functional near-infrared spectroscopy (fNIRS), or magnetoencephalography (MEG) instrument.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

The present invention relates to a system for feature selection and, more particularly, to a system for feature selection that extends supervised hierarchical clustering to neural activity signals.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Cortes, C. & Vapnik, V. (1995). Support-vector networks. Machine learning, 20(3), 273-297.
2. Fan, R. E., Chang, K. W., Hsieh, C. J., Wang, X. R., & Lin, C. J. (2008). LIBLINEAR: A library for large linear classification. The Journal of Machine Learning Research, 9, 1871-1874.
3. Kay, K. N., Rokem, A., Winawer, J., Dougherty, R. F., & Wandell, B. A. (2013). GLMdenoise: a fast, automated technique for denoising task-based fMRI data. Frontiers in Neuroscience, 7, 1-15.
4. Michel, V., Gramfort, A., Varoquaux. G., Eger, E., Keribin, C., & Thirion, B. (2012). A supervised clustering approach for fMRI-based inference of brain states. Pattern Recognition, 45(6), 2041-2049.
5. Mitchell, T. M., Shinkareva, S. V., Carlson, A., Chang, K.-M., Malave, V. L., Mason, R. A., & Just, M. A. (2008). Predicting human brain activity associated with the meanings of nouns. Science, 320(5880), 1191-1195.
6. Ward, J. H. (1963). Hierarchical grouping to optimize an objective function. Journal of the American Statistical Association, 58(301), 236-244.

(2) PRINCIPAL ASPECTS

Various embodiments of the invention include three "principal" aspects. The first is a system for feature selection of neural activity. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
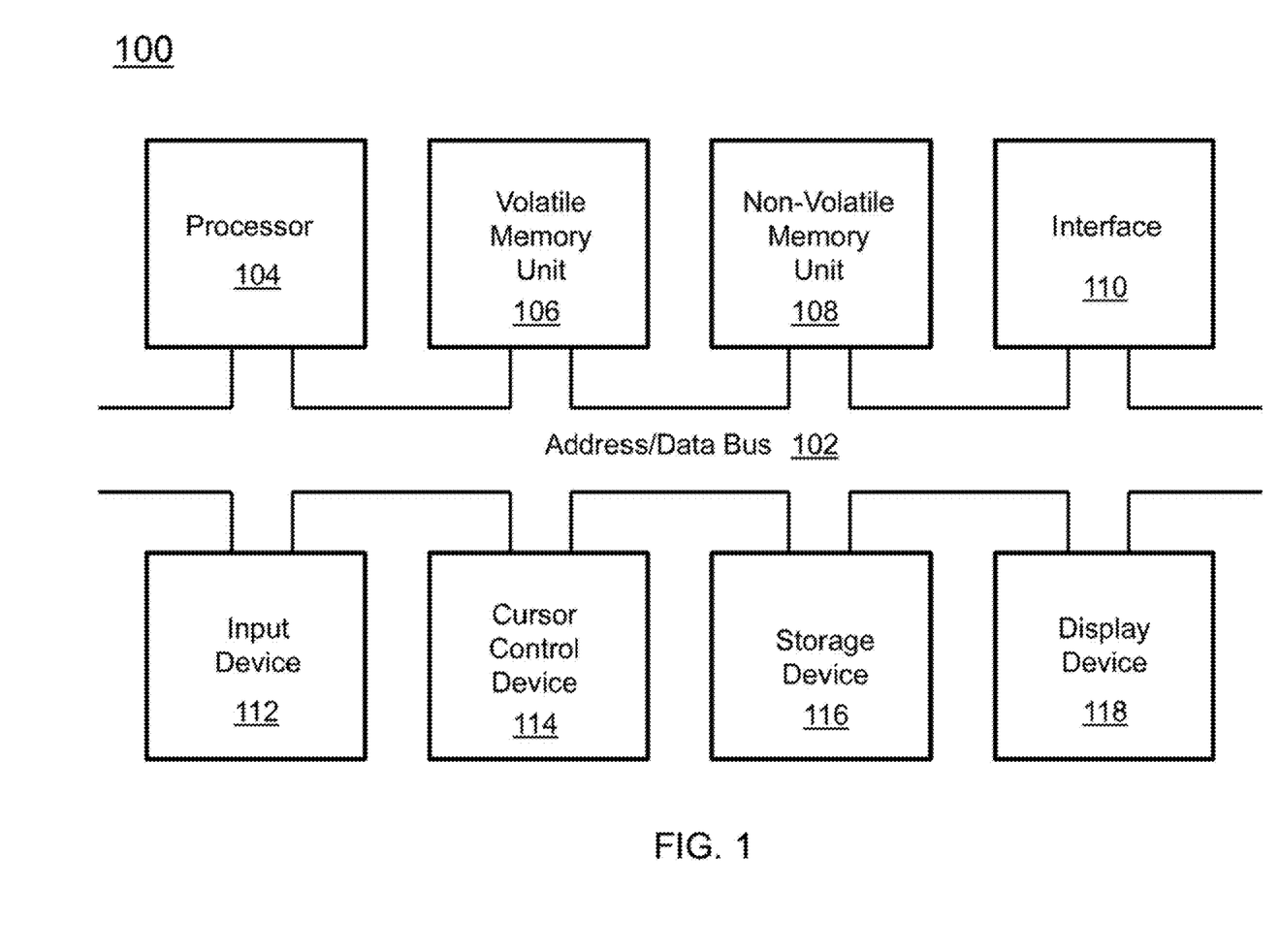
FIG. 1 is a block diagram depicting the components of a system for feature selection of neural activity according to various embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with devices for collecting neural activity data, other electronic devices, and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
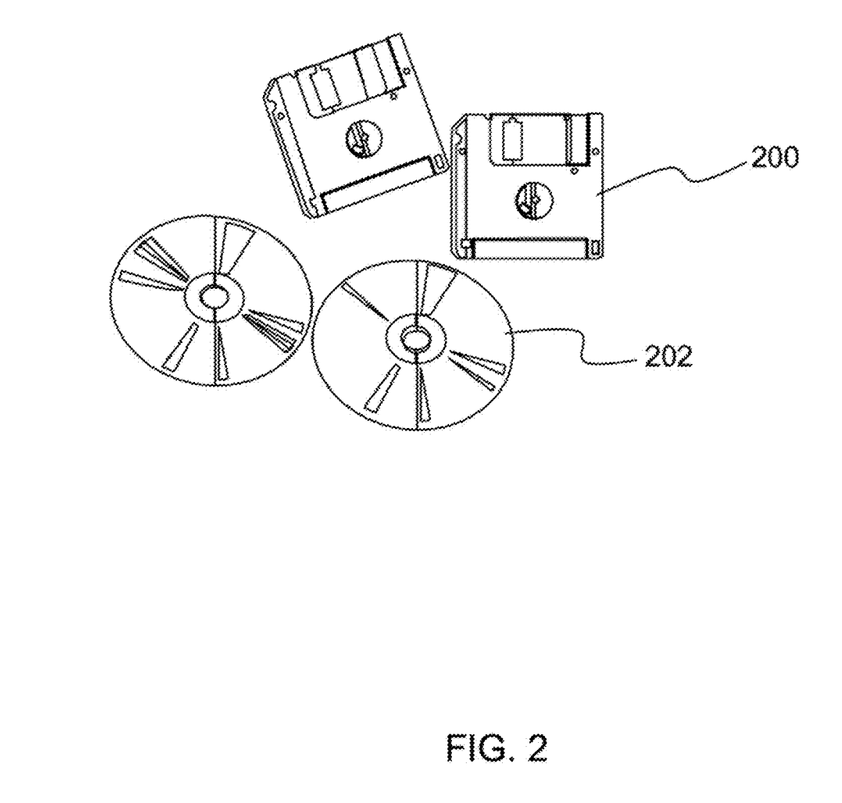
FIG. 2 is an illustration of a computer program product according to various embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENT

Described is a feature selection system and method that extends supervised hierarchical clustering to neural activity signals with a stochastic search technique. The system according to various embodiments of the present disclosure increases stimuli classification accuracy from neural activity patterns by reducing the problem dimensionality without a feature transformation applied to the spatial or temporal dimensions. Forming the data element parcellations within the neuro-anatomical space allows for a direct mapping between the reduced feature set and neural activity patterns in specific elements, such as voxels or time points. By searching the space stochastically, the large computational burden of searching the dendrogram is greatly reduced without having to reduce the size of the search space to a non-optimal parcellations set. This enables state-of-the-art neuro-cognitive models of brain function within the spatio-temporal domain to be applied to the reduced feature set. Experimental studies, as described below, are based on decoding functional magnetic resonance imaging (fMRI) brain images, but can be applied to any neural activity signal.

Clustering-based Multi-Voxel Pattern Analysis (MVPA) partitions brain regions into groups of data elements, such as voxels, with similar response profiles, is an unsupervised learning problem. The system described herein is a supervised MVPA clustering technique that achieves the goal of dimensionality reduction while maintaining the discriminating properties of the individual neural data elements. It consists of two stages: unsupervised hierarchical clustering to produce a dendrogram of the neural data and supervised dendrogram pruning to determine the optimal data parcellation with the highest classifier precision score. The parcellation is then used as a low-dimensional neural feature set for classifier training.

The Ward clustering algorithm is the MVPA hierarchical agglomerative clustering method used to produce a dendrogram based on functional magnetic resonance imaging (fMRI) voxel profile similarity (see Literature Reference No. 6). In general, it is not necessary to use Ward clustering, as any hierarchical clustering method that results in a dendrogram will suffice. The voxel profile similarity is determined by a distance metric between the time courses of two voxels and measures the extent of information loss that will occur if they are merged. The Ward clustering algorithm is extended to include a spatial connectivity constraint in order to ensure that spatially adjacent voxels are allowed to merge into contiguous clusters. The goal of the Ward clustering algorithm is to determine the set of nested voxel merges that result in the least loss of information from individual voxels up to a single cluster spanning all voxels.

The dendrogram created by the Ward clustering is a modified binary tree that defines a nested set of subtrees which form a hierarchical set of spatially adjacent fMRI brain voxel clusters in this reduction to practice. Each subtree is the result of merging the child branches into the parent cluster until the top subtree represents the parent cluster for all branches. Once the dendrogram is constructed, the problem is to determine which cluster permutation is the most discriminative using a supervised search over the dendrogram. The brain parcellation is learned from the dendrogram by adding supervised tree cutting based on the optimal prediction score for the neural classification task. This strategy determines which subtrees in the dendrogram should be cut in order to create a single cluster from that branch by computing an average neural response from the child voxels.

In the system according to various embodiments of the present disclosure, the dendrogram cutting process is treated as an optimization problem with the set of subtree cuts as the constraint and the classifier results as the objective function. The process is classifier agnostic and allows for any classifier to be used as the supervisor of the clustering strategy. In one embodiment, a Support Vector Machine (SVM) classifier is used (see Literature Reference No. 1 for a description of the SVM classifier). Because the dendrogram cutting process is an NP-hard problem, an exhaustive search over the entire solution space is not computationally feasible, and searching over a subset of the cuts may not yield a particularly good solution. Additionally, a classifier gradient that can be minimized is not readily available, and the solution space may be non-convex. Therefore, the system according to various embodiments of the present disclosure uses a stochastic optimization method to search the dendrogram space for the optimal parcellations. Stochastic methods allow for iterative sampling of the solution space and adaptive searching for the best solution according to the supervising classifier in a computationally feasible way.

(3.1) Ward Clustering

Ward agglomerative clustering combines fMRI voxels with similar neural activation signals into larger and larger clusters one at a time until all voxels have been merged into a cluster. It calculates a distance metric between the time courses of spatially adjacent voxels, which measures the extent of information loss that would occur if they are merged. A spatial constraint is enforced in order to ensure only spatially adjacent voxels are combined and prevent clusters from being composed of islands of voxels. At each iteration of the algorithm, the voxel pair with the lowest distance measure is merged into a cluster, and the distances between the new cluster and its neighboring voxels are recomputed.

At the next iteration, the voxel pair with the lowest distance measure, including the distances between the newly created cluster and its neighbors, is merged. Therefore, the possible set of voxel pairs decreases by one at each iteration until the set is empty and the full hierarchical dendrogram has been constructed. This bottom-up approach starts from isolated voxels as individual clusters and in each step merges two clusters that have the minimal cluster distance until a single cluster covers all voxels. Ensuring that the spatial connectivity constraint is satisfied is especially important in the early steps of merging, because adjacent voxels typically exhibit the spatial extension of the underlying neural activations and must be preserved by combining voxels with similar characteristics over all class stimuli.

Figure 3A:
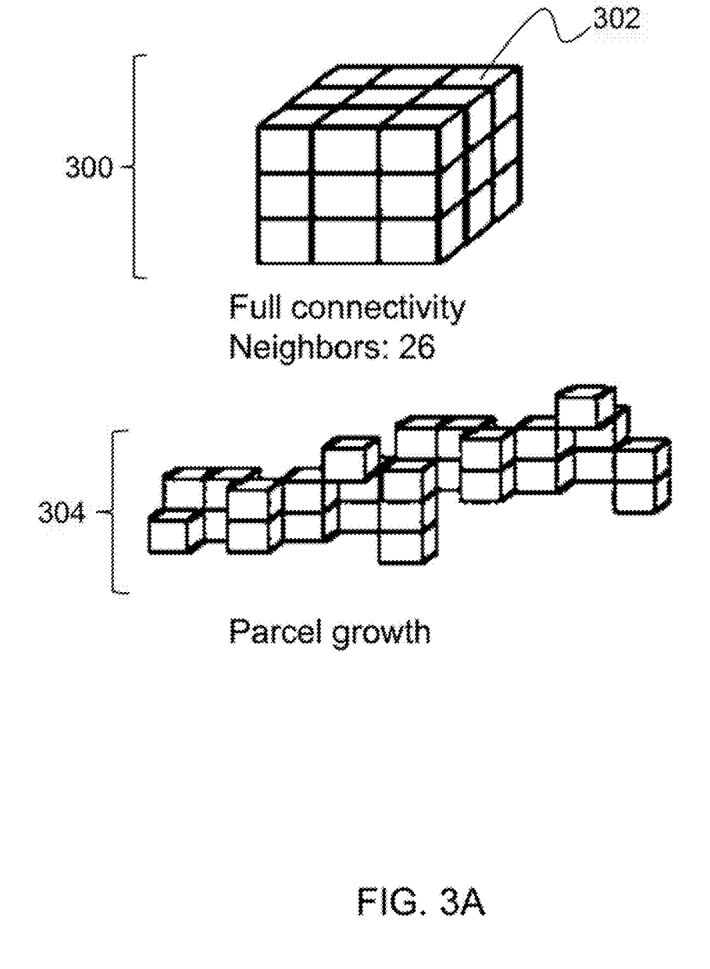
FIG. 3A is an illustration of a Ward clustering spatial connectivity constraint according to various embodiments of the present disclosure.
Figure 3B:
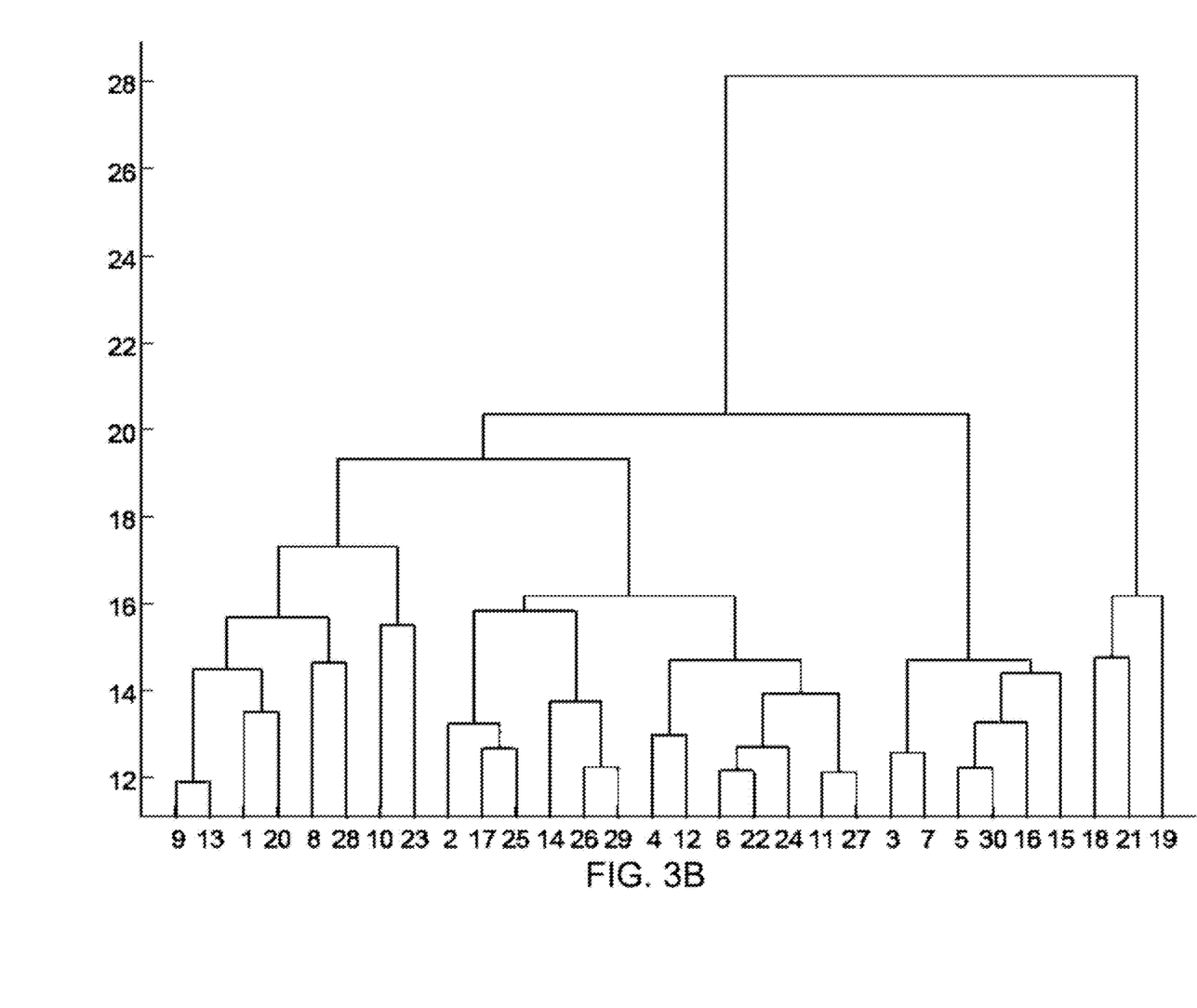
FIG. 3B is an illustration of a dendrogram of thirty voxels clustered by Ward hierarchical clustering with spatial constraint according to various embodiments of the present disclosure.

As shown in FIG. 3A, a non-limiting example of the spatial connectivity constraint is to use the 26 neighboring voxels 300 of a voxel 302. Element 304 of FIG. 3A shows another example of spatial connectivity constraints via parcel growth, merging of spatially adjacent voxels into contiguous clusters 302. Other spatial connectivity constraints can be used in the system according to embodiments of the present disclosure but were not used in experimental studies. The distance metric between two clusters used by the implementation of the Wards algorithm is the sum of the absolute value differences between all objects in the clusters, the h-distance. The computation is very efficient even with a large number of responses (or stimuli) and takes only 10 seconds to compute on a typical fMRI data set with hundreds of stimuli and tens of thousands of voxels. FIG. 3B depicts a dendrogram of 30 voxels clustered by Ward hierarchical clustering with spatial constraint. The y-axis is the distance between two subtrees as determined by the distance metric. Thirty subtrees from the top of a dendrogram are shown in FIG. 3B and illustrate the nested nature of the tree structure, with each vertical line representing a cluster and each horizontal line representing the merging of clusters into the parent cluster.

(3.2) Supervised Hierarchical Clustering (3.2.1) Stochastic Search

Figure 4:
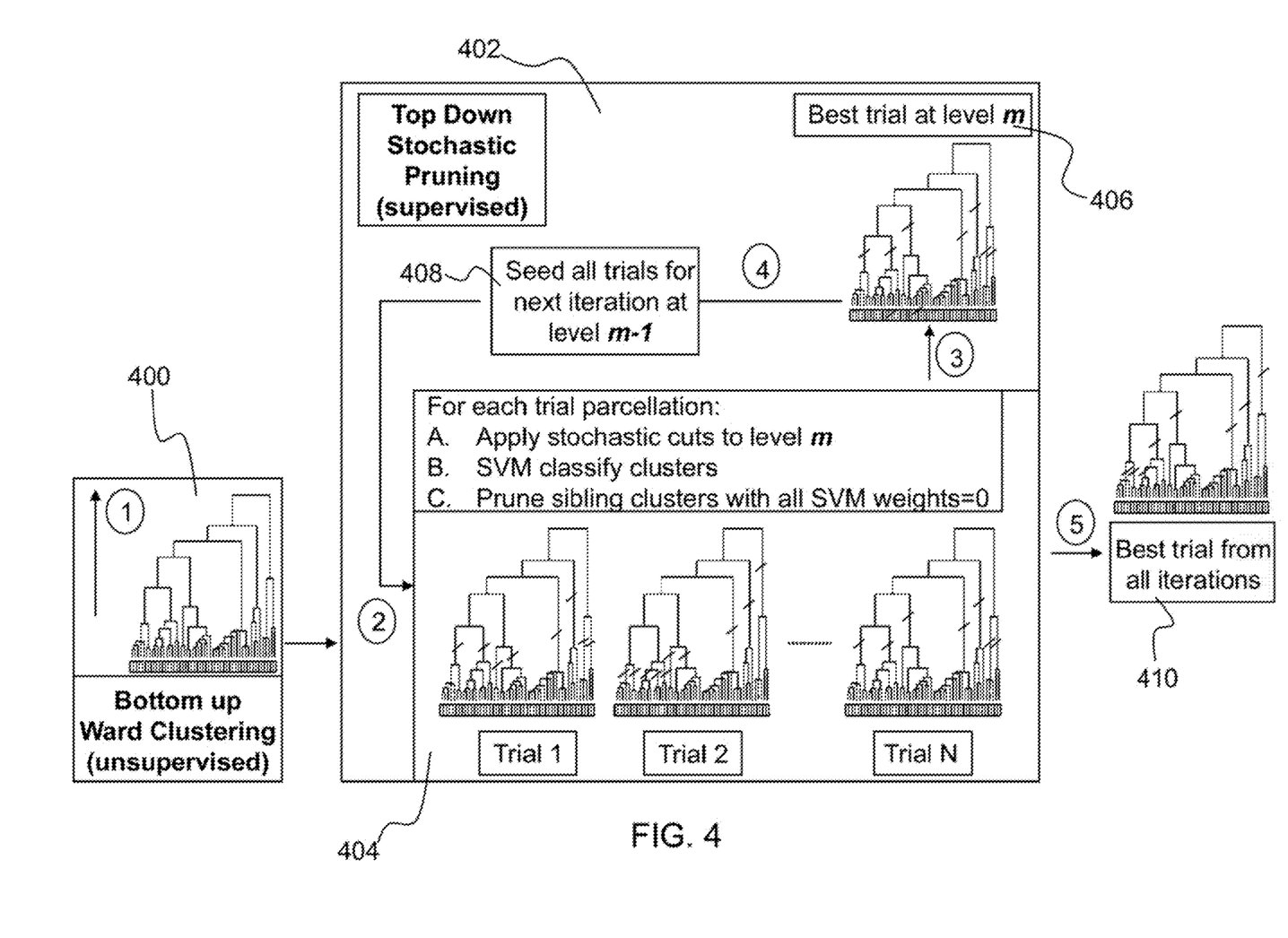
FIG. 4 is an illustration of supervised hierarchical clustering with stochastic search according to various embodiments of the present disclosure.

Once the dendrogram is created from the hierarchical clustering algorithm, as shown in FIG. 4, the parcellation strategy that provides the best classification result must be determined by the stochastic pruning stage of the algorithm. FIG. 4 illustrates an overview of supervised hierarchical clustering with stochastic search according to various embodiments of the present disclosure. This strategy determines which subtrees in the dendrogram should be cut so that all of the data elements in that subtree can be collapsed into a single neural feature or transformed into a neural feature vector. According to embodiments of the present disclosure, this is treated as an optimization problem with the set of subtree cuts as the constraint and the classifier results as the objective function. An exhaustive search over the entire solution space is not computationally feasible because the search space is so large. Therefore, as described previously, a stochastic optimization method is used to increase the computational efficiency of the search. Stochastic methods allow for iteratively sampling the solution space and adaptively searching for a good solution.

The stochastic algorithm shown in FIG. 4 takes as input the neural data to be clustered and the dendrogram generated by the hierarchical clustering (i.e., bottom up Ward clustering (unsupervised) 400). At each iteration of the stochastic pruning stage (i.e., top down stochastic pruning (supervised) 402), N trial parcellations from the population are independently modified through a set of random cuts that create N different sets of parcellations (element 404). Each of these parcellations is separately applied to the neural data and classified in order to determine their prediction score. The parcellation that provides the highest classifier prediction score (i.e., best trial at level m 406) is used to seed the N trial parcellations in the search at the next iteration of the algorithm (i.e., seed all trials for next iteration at level m−1 408). This greedy approach preserves the most discriminative set of random cuts between iterations and discards the rest.

As the N trial parcellations from the population are independently modified through a set of random cuts, the dendrogram is never modified. Instead, each subtree in the dendrogram is assigned a unique cluster identification (ID) that can be propagated down to each child subtree when a cut, or subtree clustering, occurs at the parent. A neural data cluster is defined by its cluster ID, so any data elements with the same ID are part of the same cluster. Only the cluster IDs are modified by the random cuts, not the dendrogram, so cuts from earlier iterations of the algorithm can be undone or modified by later cuts. The output is the best trial from all iterations 410.

As shown in FIG. 4, each iteration of the algorithm modifies the N trial parcellations at the dendrogram level (m-l) immediately below the one searched in the previous iteration (level m). This has the benefit of stochastically sampling the dendrogram while constraining the possible subtree cuts to a much smaller subset. It was found that the dendrogram is too large to be effectively searched by a purely stochastic algorithm, so limiting the cuts to only one level in the tree allows for a much more efficient search. Because the algorithm is stochastic within each level of the dendrogram but greedy between levels, this top down search is iterated over the dendrogram multiple times in order to enable more combinations of low level cuts with cuts from the upper levels.

In order to increase the efficiency of the algorithm in experimental studies and to reduce the computation time, it has been implemented to run in parallel on N nodes of a cluster, so that each trial parcellation is run independently of the others. Step 2 (element 404) in FIG. 4 is run separately on each node of the cluster, therefore, more nodes increases the variation at each iteration and the statistical power of the stochastic search.

(3.2.2) Stochastic Search with Subtree Pruning by Support Vector Machine (SVM) Weights The stochastic search, as described above and illustrated in FIG. 4, does not modify the dendrogram and only uses the prediction score to determine the optimal clustering pattern. However, in experimental studies, the SVM classifier output contains some very useful information besides the prediction score that can be used to rank a cluster's classification relevance and discriminability. An additional innovation that has been implemented is to use a sparse SVM classifier that applies sparsity to the linear decision boundary defined by the SVM classifier weights. These weights span the M-dimensional neural feature set of clusters, and can be used to find clusters that are not informative and can be removed from further consideration within the dendrogram search. A zero weighted cluster does not contribute to the projection of testing samples onto the decision boundary, so the dimension it represents in the lower dimensional neural space can be removed from the dendrogram without affecting the discriminability of the feature set. This addition to the stochastic search algorithm increases its search efficiency at each iteration by effectively decreasing the size of the dendrogram through marking clusters and their constituent voxels as non-informative. Non-informative clusters are passed over during later iterations of the stochastic search, thereby increasing the statistical power of the search as the algorithm progresses.

Figure 5:
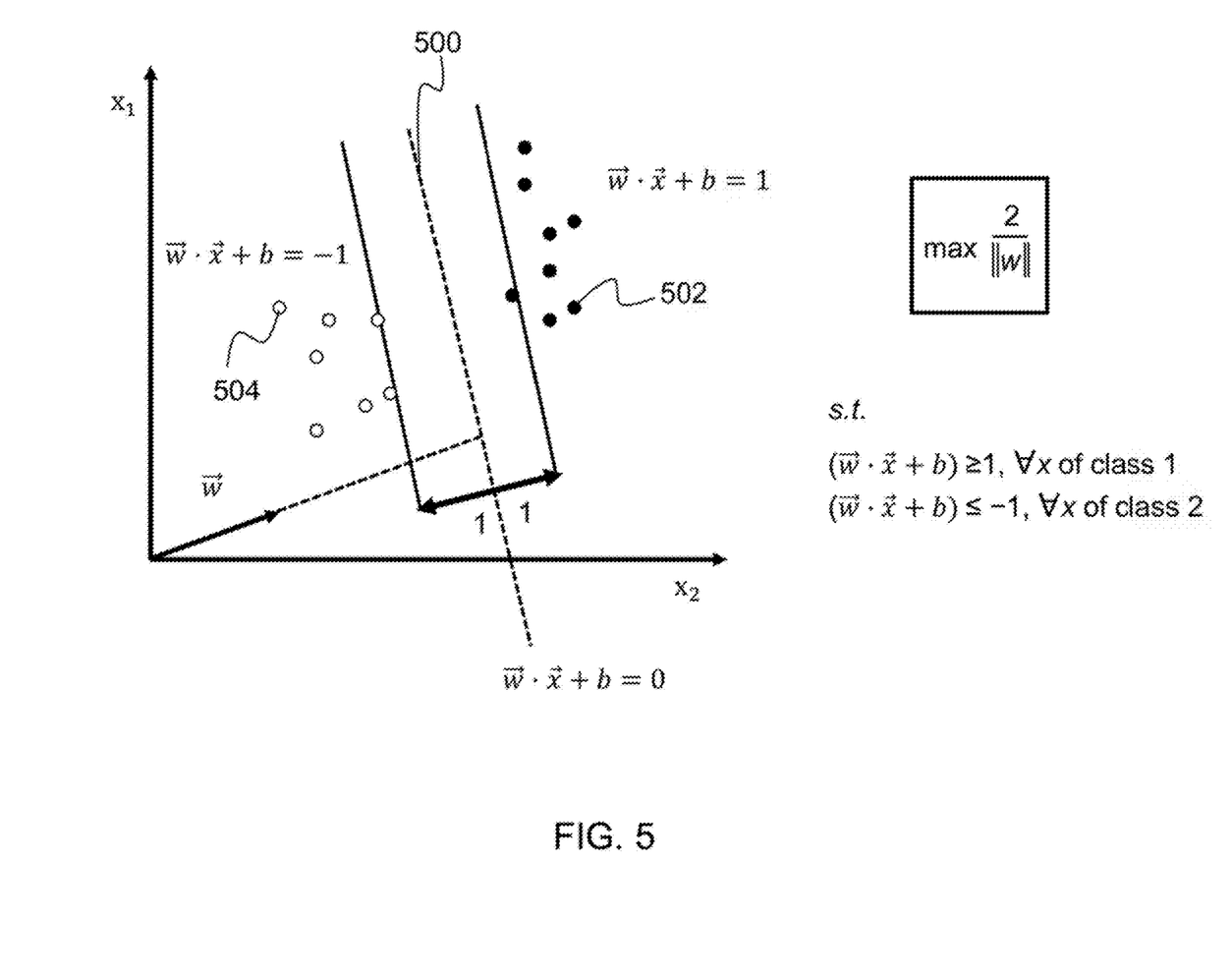
FIG. 5 is an illustration of a linear support vector machine (SVM) applied to two-dimensional data according to various embodiments of the present disclosure.

FIG. 5 depicts a linear SVM applied to 2D data. Specifically, FIG. 5 shows a two-dimensional linear SVM with a decision boundary (represented by a dashed line 500) at $\vec{w} \cdot \vec{x} + b = 0$ that separates two classes. Each labeled training sample from class 1 is represented by a filled in circle (e.g., 502), and the training samples from class −1 are represented by an unfilled circle (e.g., 504). The decision boundary 500 that separates the two classes is defined by an offset from the origin, b, and a direction defined by the orthogonal vector, $\vec{w}$. The classifier predicts the class of unknown samples, $\vec{x}$, by determining if the projection of $\vec{x}$ onto $\vec{w}$ plus b is positive or negative (i.e., $\vec{w} \cdot \vec{x} + b$). Because there are an infinite number of decision boundaries that can be used to separate the two classes in two-dimensional space, an additional criterion must be used to determine $\vec{w}$ and b during training. That criterion in standard SVMs is the maximum $l_2$-distance from each training sample to the decision boundary and is defined as the margin. Any training samples that fall on the margin are called support vectors. Training samples may fall within the margin when slack variables are introduced, but for simplicity, they have been omitted from this discussion.

The SVM classifier output contains the prediction score as well as the decision boundary parameters, $\vec{w}$ and b. Because each training/testing sample within the stochastic search has M clusters, the decision boundary vector is also M-dimensional, providing a 1-to-1 correspondence between the voxel clusters and elements of $\vec{w}$. Rewriting $\vec{w} \cdot \vec{x} + b$ as $$\sum_i^M w_i \cdot x_i + b,$$

one can see the influence of each sample dimension (i.e., cluster) on the classifier is determined by $w_i$. Dimensions with large $w_i$ will shift $\vec{w} \cdot \vec{x} + b$ to either class 1 or −1, while dimensions with low or zero $w_i$ will have little effect on the classifier prediction. Therefore, $w_i$ is used as a proxy for the relative importance of each dimension in discriminating those classes.

The system described herein deals with multi-class classification of neural concept stimuli, which makes it difficult to determine which clusters are more or less important to the classifier based on $w_i$ alone. Each class has its own sets of weights, and many clusters have a combination of small and large $w_i$ for different classes. Therefore, a cluster that is removed for not being discriminative for one class may be highly discriminative for another. By using a sparse set of $w_i$ to determine the decision boundary where an $l_1$-distance is applied to w during training instead of the standard $l_2$-distance, the classifier is allowed to determine if a dimension is non-discriminative across all class simultaneously. The $l_1$-distance promotes sparse $w_i$ so that many clusters have 0 $w_i$ across all classes, indicating they are not discriminative for any class and can be removed. In one embodiment, the LIBLINEAR SVM package is used to perform the $l_1$-regularized SVM (see Literature Reference No. 2 for a description of the LIBLINEAR SVM package).

Figure 6A:
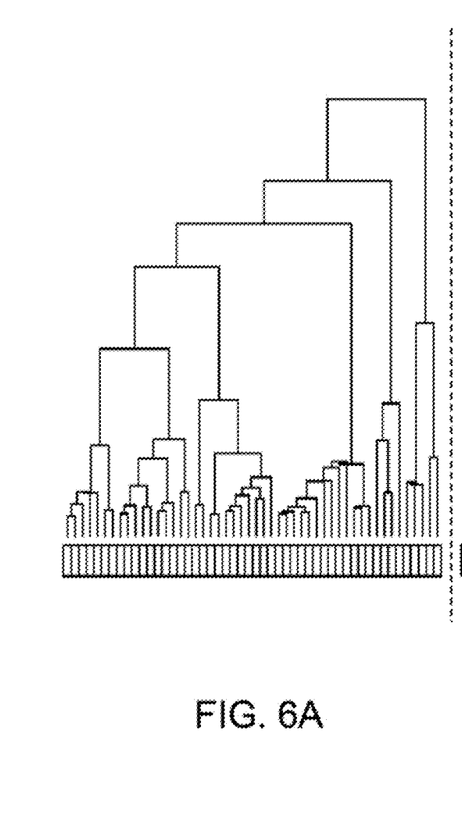
FIG. 6A is an illustration of a dendrogram prior to pruning according to various embodiments of the present disclosure.
Figure 6B:
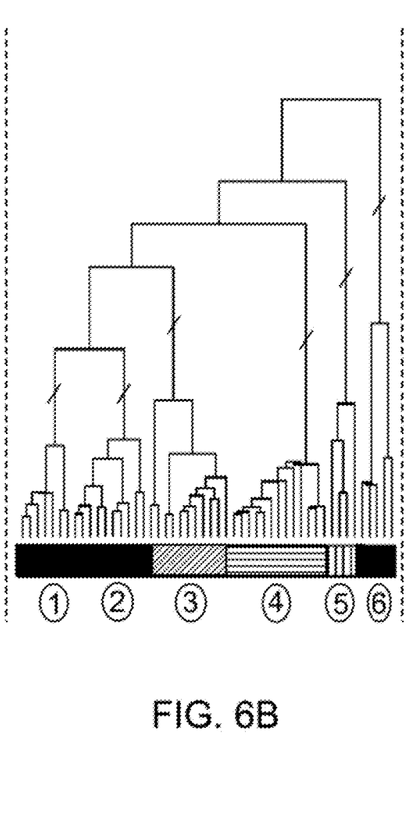
FIG. 6B is an illustration of clusters 1, 2, and 6 in the dendrogram being zero-weighted per the SVM classifier, but only clusters 1 and 2 are dendrogram siblings according to various embodiments of the present disclosure.
Figure 6C:
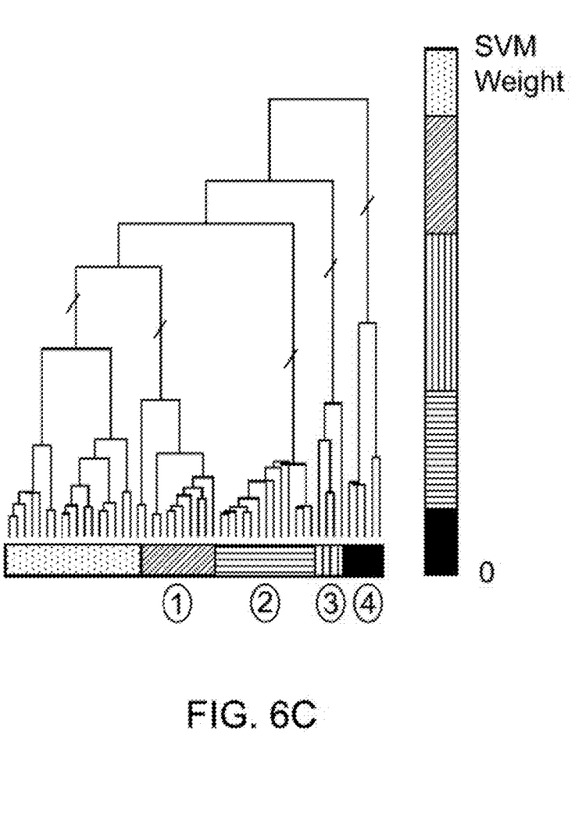
FIG. 6C is an illustration of pruning of clusters 1 and 2 from the dendrogram, while cluster 6 has been left intact and renamed cluster 4 for the next iteration according to various embodiments of the present disclosure.

FIGS. 6A-6C illustrate how cluster pruning is performed through the use of sparse SVM weights applied to the neural feature set. At every iteration of the algorithm, each trial parcellation is classified by the $l_1$-regularized SVM and a set of sparse cluster weights ($w_i$) is determined for the parcellation. Because of the noisy nature of neural datasets, it is possible for a cluster to be erroneously removed if it has a 0 $w_i$. Therefore, in order to prevent clusters from being removed unnecessarily, a conservative approach to cluster pruning is used, whereby clusters are only removed from the dendrogram that are zero weighted and have dendrogram siblings that are also zero weighted. Dendrogram siblings have similar information content per the distance metric used to construct the dendrogram, so the likelihood of sibling clusters both being erroneously zero weighted is low.

FIG. 6A depicts a dendrogram prior to pruning. In FIG. 6B, clusters 1, 2, and 6 are all zero-weighted per the SVM classifier, but only clusters 1 and 2 are dendrogram siblings. Therefore, in FIG. 6C, clusters 1 and 2 have been pruned from the dendrogram, and cluster 6 has been left intact and renamed cluster 4 for the next iteration of the algorithm. A more conservative approach to cluster pruning, which only prunes clusters if their siblings as well as cousins are all zero weighted, has also been implemented and prunes the dendrogram at a much slower rate, if needed.

(3.3) Experimental Studies

The system according to various embodiments of the present disclosure was tested on the visual fMRI data from Literature Reference No. 3, in which there are m=350 fMRI brain volumes for each subject from (35 exemplars)×(10 epochs) stimuli.

Figure 7:
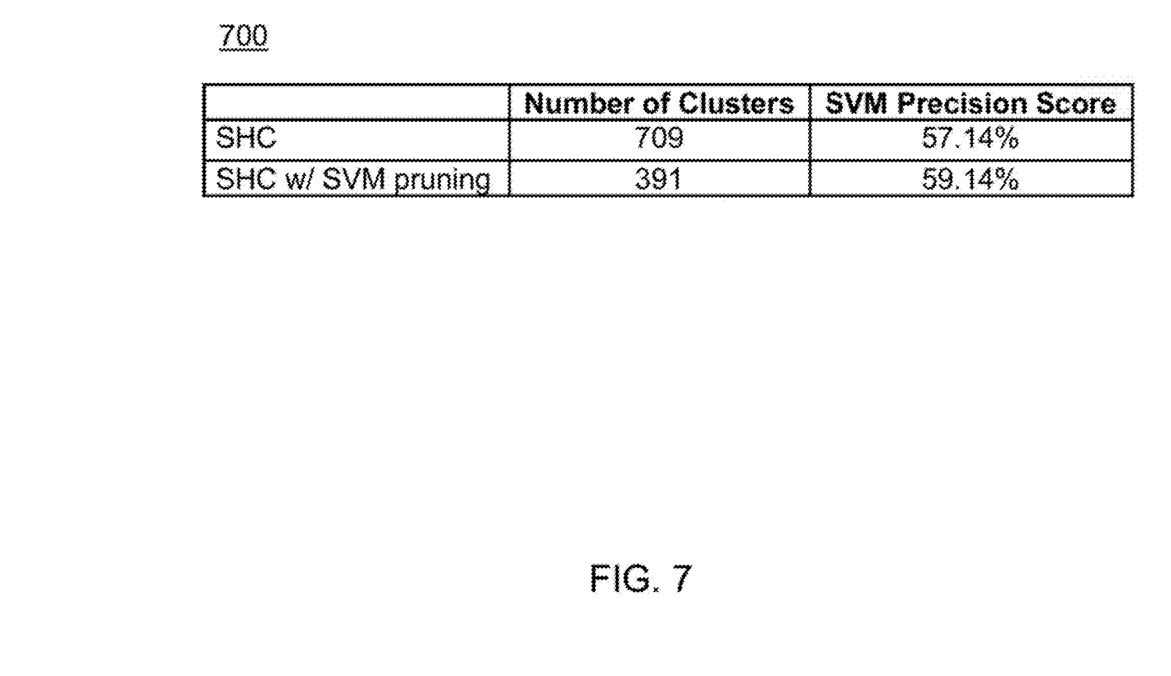
FIG. 7 is a table of results for hierarchical clustering with and without SVM weight pruning according to various embodiments of the present disclosure.

Leave-1-out (epoch) cross validation was performed for one subject (number 10) so that nine epochs were used to train the hierarchical clustering algorithm using SVM as the supervising classifier. Results were generated with and without SVM weight pruning to reduce the size of the dendrogram during training. The fMRI data had a total of 27,230 voxels prior to clustering which was reduced to the data shown in the table 700 in FIG. 7.

Figure 8:
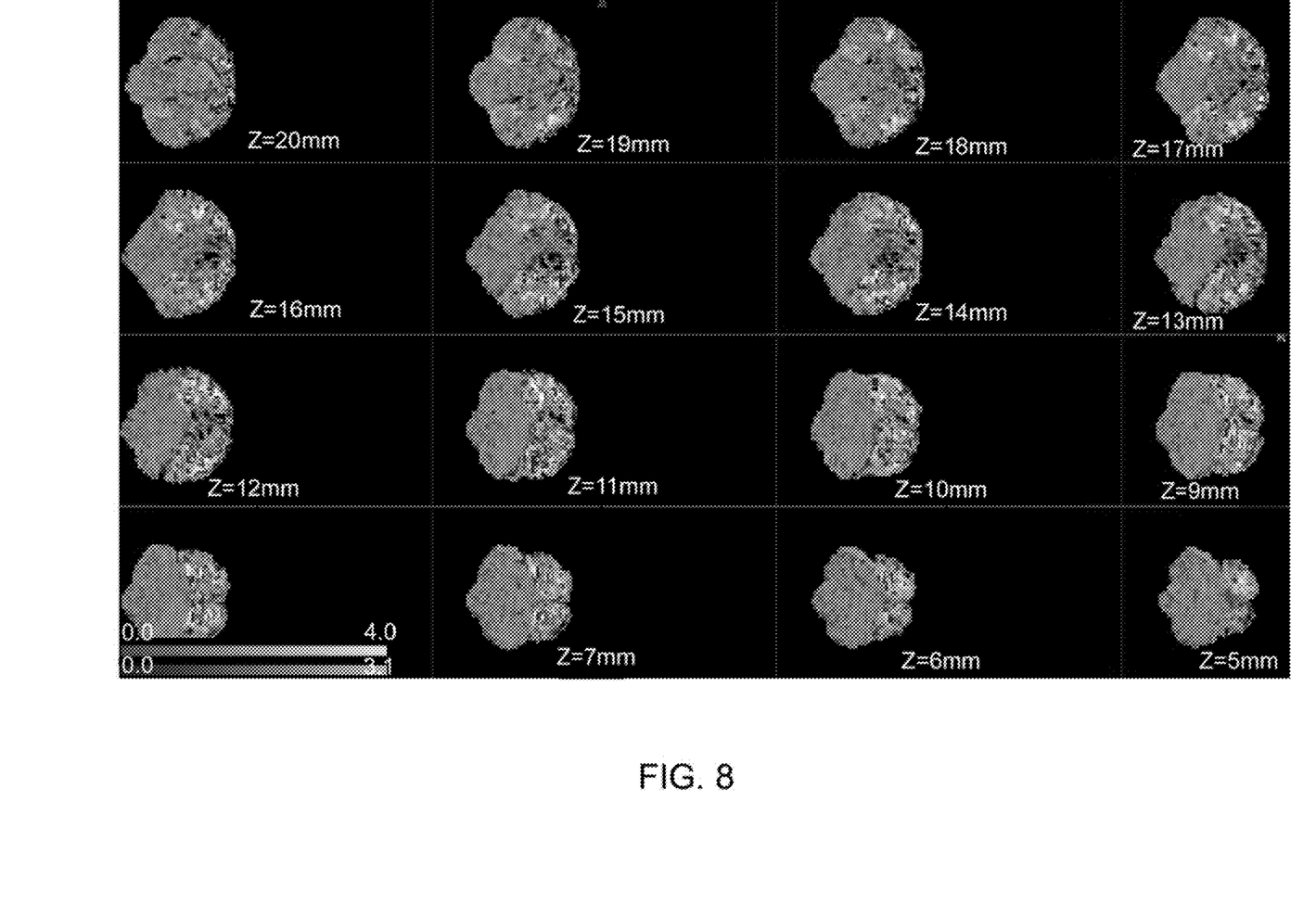
FIG. 8 is an illustration of voxel clusters determined by supervised hierarchical clustering with stochastic search according to various embodiments of the present disclosure.

FIG. 8 shows the projection of the SHC (supervised hierarchical clustering) onto the mean fMRI BOLD images of the Kay subject 10 data (see Literature Reference No. 6). The red-yellow clusters were generated using hierarchical clustering with SVM weight pruning, and the blue clusters were generated using only hierarchical clustering. The SVM weight for each cluster is used to determine the shade of blue or red-yellow projected onto the BOLD images. Light blue and yellow signify higher SVM weights while dark blue and red signify lower SVM weights. As shown, there are far more blue clusters than red-yellow, with blue clusters being an approximate super set of yellow-red. This is consistent with FIG. 7, which showed hierarchical clustering with SVM weight pruning resulted in 45% fewer clusters but a higher SVM precision score. This indicates that hierarchical clustering with SVM weight pruning finds the most highly discriminative clusters in the fMRI images from the set of clusters determined by hierarchical clustering without SVM weight pruning.

In summary, the system described herein is a feature selection method that extends supervised hierarchical clustering to neural activity signals, such as fMRI brain volumes (four dimensional images), associated with different concept stimuli. Given the fMRI brain images activated from different stimuli, a hierarchical dendrogram using a bottom-up approach is constructed, which starts from isolated data elements, such as voxels, as individual clusters and, in each step, merges two clusters until a single cluster spans all elements. The dendrogram describes the hierarchical set of brain clusters as a modified binary tree, whereby the parent cluster is the result of merging its children. A top-down approach is then used to determine the optimal cluster parcellation with respect to a supervising classifier. A stochastic method is used to search the solution space of the classifier constrained by the dendrogram structure in order to reduce the computational complexity of the problem compared to previous methods.

Additionally, the system described is based on the unique use of hierarchical clustering with stochastic supervised search to determine a reduced feature set for classification of neural activation signals. This technique will be an important component of any neural activity based classification system. The neural domains needing classification can come from any number of signal sources with large dimensionality, such as functional magnetic resonance imaging (fMRI), functional magnetic resonance imaging blood-oxygen-level depending (fMRI BOLD), electroencephalogram (EEG), functional near-infrared spectroscopy (fNIRS), and magnetoencephalography (MEG).

Additionally, the system according to various embodiments of the present disclosure reduces the dimensionality of neural data for the purposes of classification in order to increase classifier precision and reduce the possibility of overtraining caused by high dimensional data sets. The decoding of neural signals in general, whether for intent or performance monitoring, is of interest to augment human machine interfaces. For instance, vehicle manufacturing companies can use the system described herein for new neural decoding methods for vehicle operators (e.g., drivers and pilots). The EEG signals can be transformed and used as features in a classifier trying to detect intent, "thought" commands, or responses.

Another application area is in human subject training and learning. EEG systems have been used to infer performance in the human brain during instruction through decoding secondary signals, such as level of attention and working memory load. The system can be used to discover whether the explicit knowledge during instruction is related to the structure of neural signals, such as the spatiotemporal patterns of foreground or background processing as expressed in EEG. Training, such as analyst training, is another area of interest.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for feature selection of neural activity, the system comprising:
    an interface for receiving a set of neural activity data; and
    one or more processors and a non-transitory computer-readable medium having executable instructions encoded thereon such that when executed, the one or more processors perform operations of:
    generating, using a hierarchical clustering process, a hierarchical dendrogram of neural data clusters comprising the set of neural activity data, wherein the hierarchical dendrogram comprises a plurality of levels;
    performing a stochastic supervised search process of the hierarchical dendrogram, wherein the stochastic supervised search process comprises a plurality of iterations of a stochastic pruning stage;
    at each iteration of the stochastic pruning stage:
    generating a plurality of trial parcellations at a dendrogram level m;
    for each trial parcellation:
        applying stochastic cuts to the trial parcellation;
        classifying the neural data clusters in the trial parcellation by a, support vector machine (SVM) classifier to determine a prediction score;
        using the SVM classifier, determining a set of zero weighted clusters from the neural data clusters; and
        pruning zero weighted neural data clusters from the trial parcellation;
    identifying a trial parcellation having a highest prediction score at dendrogram level m;
    using the trial parcellation having the highest prediction score at level m, seeding a plurality of trial parcellations at a dendrogram level m−1;
    using the prediction scores for all iterations, determining a best trial parcellation of the hierarchical dendrogram, resulting in a reduced neural activity feature set;
    training the classifier using the reduced neural activity feature set;
    classifying the set of neural activity data using the trained classifier; and
    decoding the classified set of neural activity data.

2. The system as set forth in claim 1, wherein the stochastic supervised search process is used to search a solution space constrained by the hierarchical dendrogram in order to reduce computational complexity.

3. The system as set forth in claim 1, wherein the one or more processors further perform an operation of determining discriminability of clusters generated by the stochastic supervised search process.

4. The system as set forth in claim 1, wherein the one or more processors further perform an operation of generating a direct mapping between the reduced neural activity feature set and neural activity patterns in the set of neural activity data.

5. The system as set forth in claim 1, wherein the set of neural activity data is from a functional magnetic resonance imaging (fMRI), fMRI BOLD, electroencephalogram (EEG), functional near-infrared spectroscopy (fNIRS), or magnetoencephalography (MEG) instrument.

6. A computer implemented method for feature selection of neural activity, the method comprising an act of:
    causing one or more processors to execute instructions encoded on a non-transitory computer-readable medium, such that upon execution, the one or more processors perform operations of:
    receiving a set of neural activity data via an interface;
    generating, using a hierarchical clustering process, a hierarchical dendrogram of neural data clusters comprising the set of neural activity data, wherein the hierarchical dendrogram comprises a plurality of levels;
    performing a stochastic supervised search process of the hierarchical dendrogram, wherein the stochastic supervised search process comprises a plurality of iterations of a stochastic pruning stage;
    at each iteration of the stochastic pruning stage:
    generating a plurality of trial parcellations at a dendrogram level m;
    for each trial parcellation:
        applying stochastic cuts to the trial parcellation;
        classifying the neural data clusters in the trial parcellation by a support vector machine (SVM) classifier to determine a prediction score,
        using the SVM classifier, determining a set of zero weighted clusters from the neural data clusters, and
        pruning zero weighted neural data clusters from the trial parcellation;
    identifying a trial parcellation having a highest prediction score at dendrogram level m;
    using the trial parcellation having the highest prediction score at level m, seeding a plurality of trial parcellations at a dendrogram level m−1;

using the prediction scores for all iterations, determining a best trial parcellation of the hierarchical dendrogram, resulting in a reduced neural activity feature set;

training the classifier using the reduced neural activity feature set;

classifying the set of neural activity data using the trained classifier; and decoding the classified set of neural activity data.

7. The method as set forth in claim 6, wherein the stochastic supervised search process is used to search a solution space constrained by the hierarchical dendrogram in order to reduce computational complexity.

8. The method as set forth in claim 6, wherein the one or more processors further perform an operation of determining discriminability of clusters generated by the stochastic supervised search process.

9. The method as set forth in claim 6, wherein the one or more processors further perform an operation of generating a direct mapping between the reduced neural activity feature set and neural activity patterns in the set of neural activity data.

10. The method as set forth in claim 6, wherein the set of neural activity data is from a functional magnetic resonance imaging (fMRI), fMRI BOLD, electroencephalogram (EEG), functional near-infrared spectroscopy (fNIRS), or magnetoencephalography (MEG) instrument.

11. A computer program product for feature selection of neural activity, the computer program product comprising:

a non-transitory computer-readable medium having executable instructions encoded thereon, such that upon execution of the instructions by one or more processors, the one or more processors perform operations of:

generating, using a hierarchical clustering process, a hierarchical dendrogram of neural data clusters comprising a set of neural activity data, wherein the hierarchical dendrogram comprises a plurality of levels;

performing a stochastic supervised search process of the hierarchical dendrogram, wherein the stochastic supervised search process comprises a plurality of iterations of a stochastic pruning stage;

at each iteration of the stochastic pruning stage:

generating a plurality of trial parcellations at a dendrogram level m;

for each trial parcellation:

applying stochastic cuts to the trial parcellation;

classifying the neural data clusters in the trial parcellation by a support vector machine (SVM) classifier to determine a prediction score;

using the SVM classifier, determining a set of zero weighted clusters from the neural data clusters; and pruning zero weighted neural data clusters from the trial parcellation;

identifying a trial parcellation having a highest prediction score at dendrogram level m;

using the trial parcellation having the highest prediction score at level m, seeding a plurality of trial parcellations at a dendrogram level m−1;

using the prediction scores for all iterations, determining a best trial parcellation of the hierarchical dendrogram, resulting in a reduced neural activity feature set;

training the classifier using the reduced neural activity feature set;

classifying the set of neural activity data using the trained classifier; and decoding the classified set of neural activity data.

12. The computer program product as set forth in claim 11, wherein the stochastic supervised search process is used to search a solution space constrained by the hierarchical dendrogram in order to reduce computational complexity.

13. The computer program product as set forth in claim 11, further comprising instructions for causing the one or more processors to further perform an operation of determining discriminability of clusters generated by the stochastic supervised search process.

14. The computer program product as set forth in claim 11, further comprising instructions for causing the one or more processors to further perform an operation of generating a direct mapping between the reduced neural activity feature set and neural activity patterns in the set of neural activity data.

* * * * *